United States Patent [19]

Eastman

[11] 4,253,968
[45] Mar. 3, 1981

[54] PROCESS OF INHIBITING PRECIPITATION OF CALCIUM SALTS UTILIZING A COPOLYMER OF ALLYL MONOMERS AND MALEIC ANHYDRIDE

[75] Inventor: Gordon E. Eastman, Houston, Tex.

[73] Assignee: Hercules Incorporated, Wilmington, Del.

[21] Appl. No.: 67,641

[22] Filed: Aug. 17, 1979

Related U.S. Application Data

[63] Continuation of Ser. No. 829,694, Aug. 31, 1977, abandoned.

[51] Int. Cl.$^3$ .............................................. C02F 1/56
[52] U.S. Cl. ...................................... 210/698; 252/180; 526/227
[58] Field of Search ................... 210/54, 58; 252/180, 252/181; 526/227

[56] References Cited

U.S. PATENT DOCUMENTS

| 2,562,852 | 7/1951 | Baer | 526/227 |
| 2,723,956 | 11/1955 | Johnson | 210/58 |
| 3,617,577 | 11/1971 | King | 210/58 |
| 3,715,307 | 2/1973 | Johnson et al. | 210/58 |
| 4,001,134 | 1/1977 | Markofsky et al. | 252/181 |
| 4,126,549 | 11/1978 | Jones et al. | 210/58 |

FOREIGN PATENT DOCUMENTS

1414918  11/1975  United Kingdom ...................... 210/58

*Primary Examiner*—Peter A. Hruskoci
*Attorney, Agent, or Firm*—Michael B. Keehan

[57] ABSTRACT

A process is provided for inhibiting the deposition of scale onto the surfaces of metals in a cooling water system. In the process a copolymer of maleic anhydride or maleic acid and certain allyl monomers is employed as the scale inhibiting composition. The copolymers are effective as scale inhibitors when employed in substoichiometric amounts.

9 Claims, No Drawings

PROCESS OF INHIBITING PRECIPITATION OF CALCIUM SALTS UTILIZING A COPOLYMER OF ALLYL MONOMERS AND MALEIC ANHYDRIDE

This is a continuation of application Ser. No. 829,694, filed Aug. 31, 1977 now abandoned.

This invention relates to a method for inhibiting the precipitation of calcium salts and other polyvalent metal salts of the phosphate, carbonate and sulfate anions from industrial recirculating cooling water.

More particularly, this invention relates to a process of inhibiting the precipitation of calcium phosphate salts, calcium carbonate, calcium sulfate, and other polyvalent metal salts of these anions from industrial recirculating cooling water systems by the addition to said systems in substoichiometric amounts of the copolymers of an allyl monomer and maleic anhydride.

Calcium and other polyvalent metal compounds present in cooling water systems readily form precipitates which adhere to metal surfaces and adversely affect the cooling performance of such cooling systems. The approach to maintaining good performance in cooling water systems has been to inhibit the precipitation of calcium and other polyvalent metal compounds by adding certain chemicals to the cooling water, which chemicals prevent precipitation of said compounds and to add chemicals to the cooling water systems which modify the crystal growth of the compounds in such a way as to prevent agglomeration of the precipitated compound and adherence of the precipitated compound to metal surfaces within the cooling water system.

Chemicals used to achieve these objectives are sometimes referred to in the water treatment art as antifoulants, scale control agents, deposit control agents or rate control agents.

Chemicals which have been used to prevent the precipitation of calcium and other polyvalent metal salts and to prevent adherence of precipitates of calcium and other polyvalent metal salts to metal surfaces within cooling water systems include 1-alkylphosphonic acids and their salts, 1-aminoalkyl-1,1-diphosphonic acids and their salts, alkali metal polyphosphates, alkali metal polyacrylates, maleic anhydride—styrene copolymers, and copolymers of maleic anhydride and ethylenically unsaturated monomers such as acrylic acid, methacrylic acid, acrylamide, vinyl acetate, acrolein, and acrylonitrile. These compounds and other compounds which are copolymers of maleic anhydride and a monoethylenically unsaturated monomer are disclosed in U.S. Pat. No. 2,723,956 as suitable for use in boilers for reducing scale formation. Other compounds suitable for inhibiting precipitation of calcium salts in aqueous systems are disclosed in U.S. Pat. No. 3,617,577 and British Application No. 007181, filed in 1973 and assigned to Ciba-Geigy AG.

In accordance with this invention a process is provided to inhibit the precipitation of calcium and other polyvalent metal salts in cooling water systems, comprising adding to the water a copolymer of maleic anhydride and an allyl compound of formula (1):

$$CH_2=CH-CH_2-R \quad (1)$$

where R is a radical selected from the group consisting of:

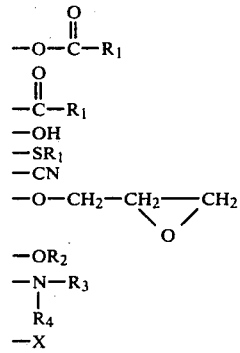

wherein $R_1$ is hydrogen or a straight or branched chain alkyl group having from 1 to 5 carbon atoms; $R_2$ is a straight or branched chain alkyl having from 1 to 5 carbon atoms; $R_3$ is hydrogen, and $R_4$ is hydrogen or

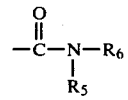

wherein $R_5$ is hydrogen and $R_6$ is hydrogen or a straight or branched chain alkyl having from 1 to 5 carbon atoms. The preferred copolymer used in the process of this invention is the copolymer prepared from maleic anhydride and allyl acetate in a 1:1 mole ratio.

The copolymer employed in the process of this invention has the general formula (2) below in which R is a radical as defined above and n is an integer from 2 to 100.

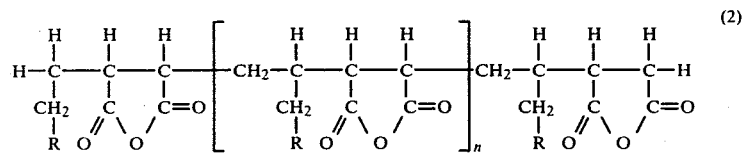

The hydrolyzed form of the copolymers defined by formula (2) can be employed in the process of this invention and is substantially equivalent in performance for inhibiting scale formation in aqueous systems as the unhydrolyzed form of the copolymer defined by formula (2) above. Throughout the specification and claims the copolymers defined by formula (2) are meant to include the hydrolyzed form of each copolymer. The copolymers of this invention can either be copolymers prepared from maleic anhydride or maleic acid and in this specification and claims maleic anhydride is meant to be the equivalent of and inclusive of maleic acid.

In the process of this invention the mole ratio of maleic anhydride to the allyl monomer defined in formula (1) is from about 5:1 to about 1:5, and the preferred mole ratio is about 1:1. The molecular weight range of the copolymers employed in the process of this invention is from about 500 to about 20,000. Molecular weights of the copolymers employed in the process of this invention are determined by osmometry.

In the process of this invention a copolymer defined by formula (2) is added to cooling water systems in substoichiometric amounts. The copolymer is employed in the process of this invention in amounts of from about 0.5 ppm to about 100 ppm, with a preferred amount of copolymer being in the range of 1 ppm to 25 ppm. Mixtures of copolymers of formula (2) can be employed in the process of this invention.

The process of this invention is particularly suitable for use with open recirculating water systems but it can also be used in closed cooling water systems such as evaporators, boilers, and heat exchangers of other types.

The process of this invention is illustrated in the examples which follow. In the examples percentages are by weight unless specified otherwise.

The following example illustrates preparation of a copolymer of this invention in which the allyl monomer is allyl acetate. Other copolymers of maleic anhydride and allyl monomers can be prepared following a similar procedure.

EXAMPLE 1

Fifteen grams (0.15 mole) of allyl acetate and 14.7 grams (0.15 mole) of maleic anhydride were dissolved in 90 grams of dioxane. The resulting solution was sparged with nitrogen for one hour. One and one-half grams of a 5% solution of benzoyl peroxide was added to the solution of reactants and sparging with nitrogen was continued for 15 minutes. This solution was heated to reflux temperature (about 100° C.) and refluxed for one hour under nitrogen. An additional 1.5 grams of a 5% solution of benzoyl peroxide was added to the refluxing reaction mass (solution) and refluxing continued for an additional hour. Water was added slowly during refluxing to prevent the copolymer formed by reaction from precipitating from the reaction mass. The rate of addition of water to the reaction mass is controlled so as to maintain the temperature of the reaction mass at at least 80° C. Sufficient water is added to the reaction mass containing copolymer to provide a concentration of dissolved copolymer of about 10%. The copolymer solution was cooled to room temperature and was used directly in the jar tests described hereinafter.

EXAMPLES 2-9

Aqueous test solutions are prepared by adding known concentrations of scale inhibitor, calcium (or calcium chloride) and phosphate (as phosphoric acid) to distilled water. The pH of the aqueous test solutions was adjusted to a value of 6.5. The calcium ion content was 260–280 ppm and the concentration of phosphate ion ($PO_4$) varied incrementally from 10 ppm to 200 ppm for each scale inhibitor tested. One hundred milliliters of the aqueous test solutions were added to jars for use in laboratory "jar tests". The "jar tests" are described completely in *Materials Performance*, Vol. 13, No. 12, December 1974, published by National Association of Corrosion Engineers, Houston, Tex. 77001. The test method employed in the examples is the method described in this reference except that polymers were compared on weight basis for effectiveness rather than on the cost basis described in this reference. The aqueous test solutions were heated to 140° F. and the temperature of each solution was maintained at 140° F. for from 8 to 24 hours. The copolymers evaluated and the concentrates of the copolymer are defined in Table I. Results of these jar tests are set forth in Table I as % inhibition. Percent inhibition is obtained by first measuring the weight of precipitate formed from which the weight of precipitating ion is calculated. The amount of precipitating ion remaining in solution is calculated by difference. Percent inhibition is then obtained by dividing the weight of each precipitating ion in solution by the weight of such ion initially present and multiplying by 100.

TABLE I

Inhibition of Ca—$PO_4$ Salt Precipitation

| Example | Inhibitor | Active Concentration ppm | % Inhibition |
|---|---|---|---|
| 2 | Composition A[1] | 1 | 0–10 |
|  |  | 5 | 10–20 |
|  |  | 10 | 20–30 |
|  |  | 25 | 40–50 |
| 3 | Compound B[2] | 1 | 0–10 |
|  |  | 5 | 15–20 |
|  |  | 10 | 25–30 |
|  |  | 25 | 50 |
| 4 | Composition C[3] | 1 | 0–10 |
|  |  | 5 | 10–20 |
|  |  | 10 | 20–30 |
|  |  | 25 | 40–50 |
| 5 | Compound D[4] | 10 | 30–40 |
| 6 | Vinyl Acetate:Maleic Anhydride Copolymer (1:1)[5] | 10 | 30–40 |
| 7 | Methyl Vinyl Ether:Maleic Anhydride Copolymer (1:1)[5] | 10 | 20–30 |
| 8 | Allyl Acetate:Maleic Anhydride Copolymer (1:1)[5] | 1 | 70 |
| 9 | Allyl Alcohol:Maleic Anhydride Copolymer (1:1)[5] | 1 | 40–50 |

[1]Composition A is a polyquaternary amine having the formula

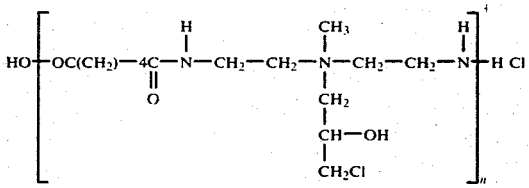

where n is an integer from 1 to 10.
[2]Compound B is aminophosphonate of the formula $N(CH_2PO_3H_2)_3$
[3]Composition C is a poly(sodium acrylate) of the formula

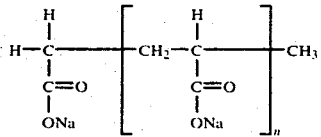

where n is an integer of from 5 to 20.
[4]Compound D is a polyhydric alcohol mixture having a repeating unit of the formula

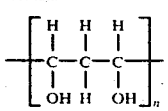

where n is an integer of from 5 to 20.
[5](1:1) relates to mole ratio of reactants reacting to form the copolymer.

Examples 2–7 represent prior art scale inhibitors. Examples 8 and 9 are copolymers employed in the process of this invention. Improved scale inhibition at much lower concentrations are achieved with copolymers employed in the process of this invention compared to the scale inhibition achieved with the prior art scale inhibitors exemplified by Examples 2–7.

EXAMPLES 10-14

Following the procedure of Example 2, aqueous test solutions were prepared containing either calcium carbonate or calcium sulfate. The calcium concentration of these salts was sufficient to exceed their respective solubility products in the test solutions. The pH of the aqueous solution was adjusted to 6.5. The solutions were aged by heating the solutions to 140° F. and maintaining the solution temperature of 140° F. for eighteen hours. The effectiveness of the copolymers of this invention (Examples 13 and 14) was compared to the effectiveness of prior art inhibiting compositions (Examples 11-13) by adding inhibitor to the aqueous test solutions at concentrations set forth in Table II and measuring the weight of calcium carbonate or calcium sulfate precipitate formed. The percent inhibition is then calculated following the method described in Examples 2-9. Percent inhibition is a measure of the relative effectiveness of each inhibitor under the test conditions. The results of the tests conducted in the foregoing manner are set forth in Table II.

TABLE II

| Example | Inhibitor | Active Ingredient (ppm) | % Inhibition $CaCO_3$ | % Inhibition $CaSO_4$ |
|---|---|---|---|---|
| 10 | Composition A[6] | 10 | 75-100 | 75-100 |
| 11 | Compound B[6] | 1 | 80-100 | 80-100 |
| 12 | Composition C[6] | 1-3 | 75-100 | 75-100 |
| 13 | Allyl Acetate:Maleic Anhydride Copolymer (1:1)[6] | 1-2 | 75-100 | 50-60 |
| 14 | Allyl Alcohol:Maleic Anhydride Copolymer (1:1)[6] | 1-2 | 75-100 | 40-50 |

[6]See footnote following Table I for definition.

What I claim and desire to protect by Letters Patent is:

1. A process for inhibiting the deposition of scale onto the surfaces of metals in open recirculating cooling water systems, said process consisting essentially of adding to the water in the cooling water system from about 0.5 parts per million to about 100 parts per million of a copolymer of maleic anhydride and an allyl compound having the formula:

$$CH_2=CH-CH_2-R$$

wherein R is a radical selected from the group consisting of

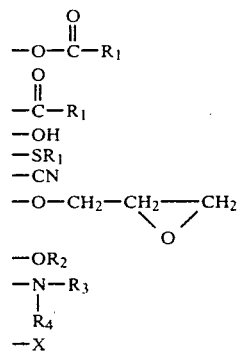

wherein $R_1$ is hydrogen or a straight or branched chain alkyl group having from 1 to 5 carbon atoms; $R_2$ is a straight or branched chain alkyl having from 1 to 5 carbon atoms; $R_3$ is hydrogen, and $R_4$ is hydrogen or

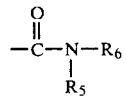

wherein $R_5$ is hydrogen and $R_6$ is hydrogen or a straight or branched chain alkyl having from 1 to 5 carbon atoms.

2. The process of claim 1 in which the allyl monomer is allyl acetate.

3. The process of claim 2 in which the copolymer is added to the water in amounts to provide from about 0.5 ppm to about 100 ppm of copolymer in the water.

4. The process of claim 1 in which the allyl monomer is allyl alcohol.

5. The process of claim 1 in which the mole ratio of maleic anhydride monomer to allyl monomer in the copolymer is from 5:1 to 1:5.

6. The process according to claim 1 wherein the copolymer is added to the water in amounts so as to provide from 1 ppm to 25 ppm copolymer in the water.

7. The process of claim 1 in which the copolymer is added to the water in amounts to provide from about 1 ppm to about 25 ppm of copolymer in the water.

8. A process for inhibiting the deposition of calcium salts and other polyvalent metal salts onto the surfaces of metals in an open recirculating cooling water system, said process consisting essentially of adding to the water a copolymer of maleic anhydride and allyl acetate, the mole ratio of maleic anhydride units to allyl acetate units in the copolymer being about 1:1 and said copolymer having a molecular weight range of from about 500 to about 10,000, said copolymer being added to the water in an amount to provide a concentration of about 0.5 ppm to about 100 ppm of copolymer in the water.

9. A process for inhibiting the deposition of scale onto the surface of metals in open recirculating cooling water systems, said process consisting essentially of adding to the cooling water system from about 0.5 parts per million to about 100 parts per million of a copolymer of maleic anhydride and an allyl compound having the formula:

$$CH_2=CH-CH_2-R$$

wherein R is a radical selected from the group consisting of

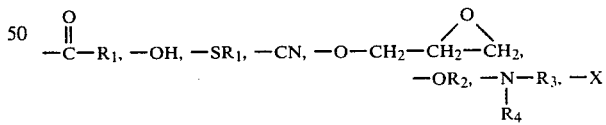

wherein $R_1$ is hydrogen or a straight or branched chain alkyl group having from 1 to 5 carbon atoms; $R_2$ is a straight or branched chain alkyl having from 1 to 5 carbon atoms; $R_3$ is hydrogen and $R_4$ is hydrogen or

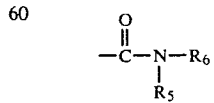

wherein $R_5$ is hydrogen and $R_6$ is hydrogen or a straight or branched chain alkyl having from 1 to 5 carbon atoms.

* * * * *